F. J. HOWELL.
DAUBER.
APPLICATION FILED MAY 27, 1920.

1,361,861. Patented Dec. 14, 1920.

Inventor.
Frank J. Howell

UNITED STATES PATENT OFFICE.

FRANK J. HOWELL, OF STONEHAM, MASSACHUSETTS.

DAUBER.

1,361,861.  Specification of Letters Patent.  Patented Dec. 14, 1920.

Application filed May 27, 1920. Serial No. 384,711.

*To all whom it may concern:*

Be it known that I, FRANK J. HOWELL, a citizen of the United States, residing at Stoneham, in the county of Middlesex and State of Massachusetts, have invented an Improvement in Daubers, of which the following is a specification.

My invention relates to daubers especially adapted for the spreading of liquid shoe polish or dressing on shoes but also applicable for other purposes.

The component parts of a shoe dauber are the handle, the shank, and the dauber or brush. The handle is usually the stopper of the bottle containing the polish and the shank usually is a single wire driven into the handle and having a hooked end-portion engaging and holding the brush.

Several faults develop with the dauber, as ordinarily constructed. The shank becomes loose in the handle and turns, so that it is difficult to use all of the brush. For this reason the shank is driven through the top of the handle and some form of a clenching means is employed. With this construction, the wire soon becomes loose in the handle and the liquid polish creeps up the shank and collects on the top of the handle to soil the fingers and that portion extended through the top of the handle becomes rusted and soon ceases to hold the shank firmly with the result that the shank and handle become separated. A cap is sometimes glued over the top of the stopper in an attempt to prevent the collection of liquid on the handle but the liquid soon softens the glue and the cap becomes loosened and comes off thereby exposing the end of the wire shank.

The object of the present invention is the provision of a dauber having means disposed on each side of the shank engaging with the handle to hold the shank fixed against rotation therein and which also firmly secures the shank to the handle against possibility of accidental separation, said means lying wholly within said handle whereby there can be no creepage of polish through the handle to the top thereof.

A further object of the invention is a novel form of brush engaging and holding means for the shank; and another object is generally to improve the construction of the dauber.

Figures 1, 2, 3:
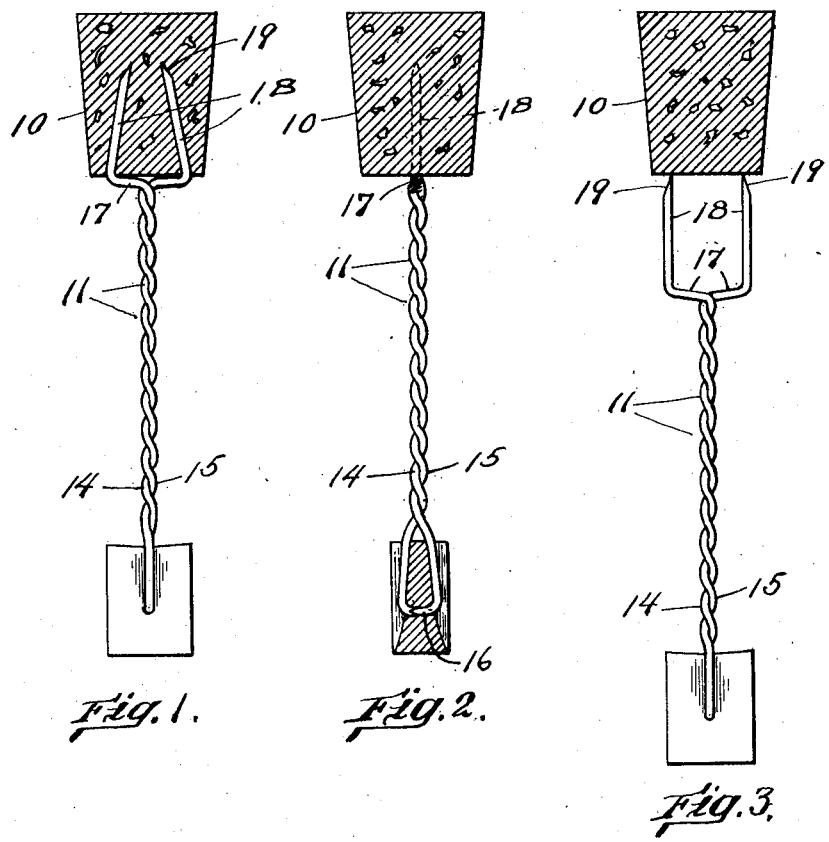
Figure 1 is a front view of the dauber with the handle in section to illustrate the improved shank holding means as inserted in the handle.
Fig. 2 is a side view of Fig. 1 with the brush in section to illustrate the improved brush-holding means.
Fig. 3 is a view of the shank with the shank in position for insertion in the handle.

As here shown the dauber includes the handle 10 which is usually the stopper for the bottle of polish or dressing and preferably is formed of a resilient, soft and non-porous material, as cork. The shank 11 may be formed of a length of wire reflexed to provide a loop-portion 12 by which the brush 13 is received and held, and the reflexed ends are twisted together as indicated; or preferably, the shank may be formed of two independent wires or equivalent members 14 and 15 twisted together to form, in effect, the single shank. The ends of said members are formed with the inturned hooks 16 which are forced in opposite directions through the brush thereby to firmly engage and clamp it.

The brush may be formed of any suitable absorbent material and a piece of felting, shaped as shown, gives excellent results.

The upper end of each wire member is reflexed outwardly on opposite sides of the shank into a position more or less perpendicular to the shank to provide the stop portion 17 against which the handle is forced and which fixes the position of the handle on the shank. The ends of said wire members, beyond the stop-portions, are bent upwardly to form the prongs 18 on opposite sides of the shank and which, before insertion into the handle, are substantially parallel with each other and with the shank.

The entering ends of said prongs are tapered from the outside inwardly as at 19 whereby wedge surfaces are formed which, when the prongs are forced into the handle, serve to force the ends of the prongs inwardly toward each other, as indicated more clearly in Fig. 1; with the result that the handle is firmly held to the shank and cannot be separated therefrom without forcibly pulling the handle and shank apart.

The handle is of such a length that the prongs are embedded therein, with no portion thereof extended through the top of the handle and, as the handle is of a non-porous material, cork, this method of construction absolutely prevents escape of the polish through the handle and its collection on the top of the handle.

It is obvious that the construction may be materially altered without departing from the spirit of my invention.

I claim:

1. A dauber comprising a shank, a brush engaged and held by said shank at one end thereof, the other end of said shank formed with two prong portions extended from each side of, and substantially parallel with said shank having their entering ends tapered from the outside inwardly.

2. A dauber comprising a shank having two interlaced wire members formed with brush engaging means at one end thereof, a brush engaged and held by said engaging means, said members at the other end of said shank reflexed to form spaced-apart substantially parallel prongs disposed on each side of said shank, said prongs having their entering ends tapered from the outside inwardly.

3. A dauber comprising a shank formed of two independent wire members twisted together, said members formed, at one end, with inwardly reflexed hooks to engage and clamp a brush, a brush engaged and held by said hooks, said wire members, at the other end of the shank, reflexed to form two spaced-apart substantially parallel prongs disposed on each side of said shank, said prongs having sharpened entering ends.

4. A dauber comprising a handle, a shank having two spaced-apart prongs on each side thereof received and secured in said handle with their entering ends directed inwardly toward each other, said shank having a stop portion engageable with said handle to fix the position of the handle on said shank, said handle being of a length greater than said prongs whereby said prongs lie entirely therein, said shank having a brush engaging and clamping portion at the other end thereof, and a brush engaged and held thereby.

5. A dauber comprising a handle, a shank, and a brush, said shank having handle receiving means comprising two prongs spaced-apart on opposite sides of the shanks received in said handle with their entering ends inwardly directed toward each other, said entering ends tapered from the outside inwardly and a stop portion engageable with the base of said handle to fix the position of the handle on said shank, said handle having a length greater than the prongs whereby said prongs lie wholly within said handle, said shank also having a brush engaging and clamping portion at the other end thereof, and said brush being engaged and clamped thereby.

In testimony whereof, I have signed my name to this specification.

FRANK J. HOWELL.